(No Model.)
J. M. RYAN.
SAW TOOTH SWAGE.
No. 319,425. Patented June 2, 1885.
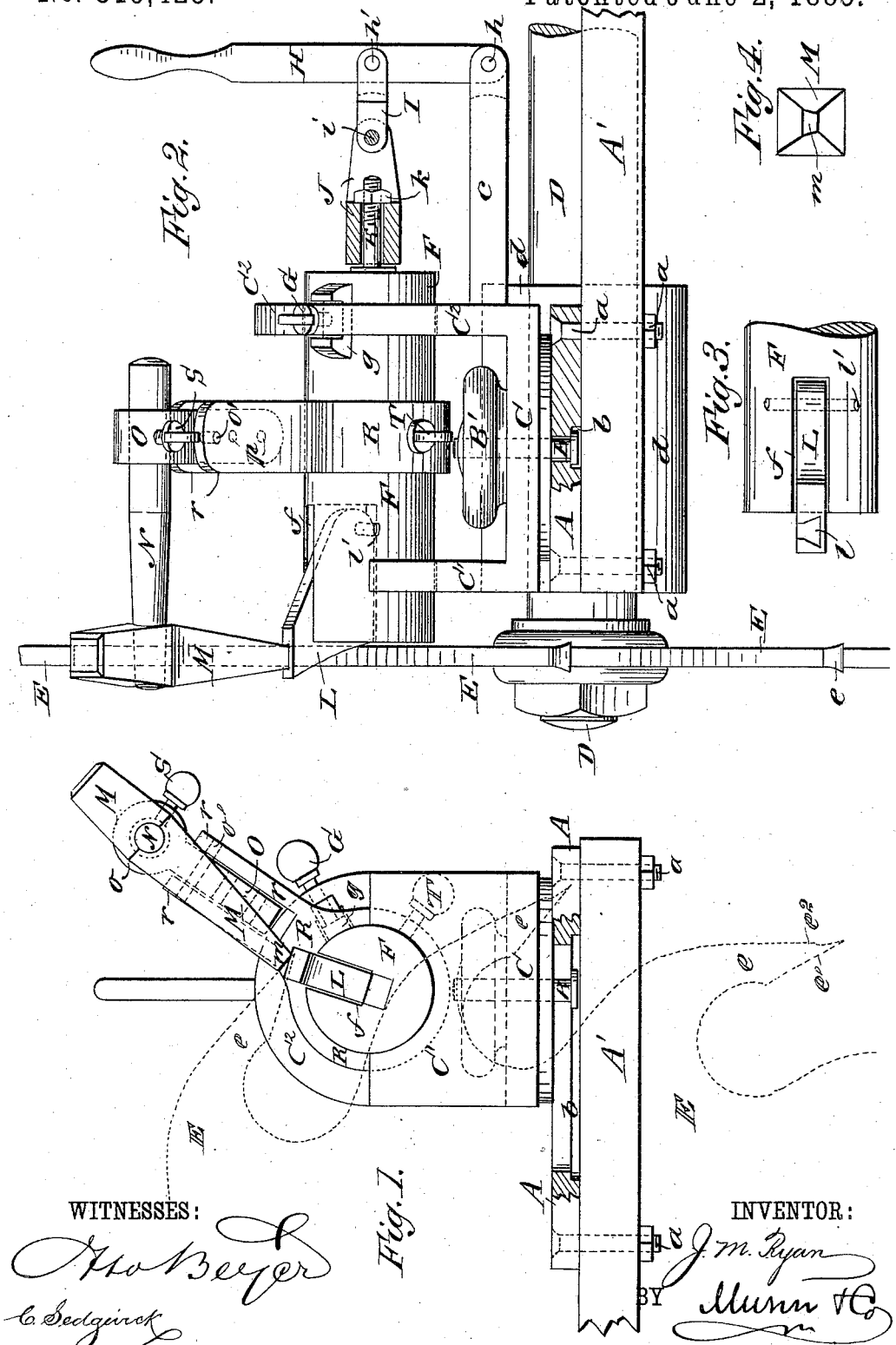
WITNESSES:
INVENTOR:
J. M. Ryan
BY Munn & Co.
ATTORNEYS.

UNITED STATES PATENT OFFICE.

JOHN M. RYAN, OF VICKSBURG, MISSISSIPPI.

SAW-TOOTH SWAGE.

SPECIFICATION forming part of Letters Patent No. 319,425, dated June 2, 1885.

Application filed February 18, 1885. (No model.)

*To all whom it may concern:*

Be it known that I, JOHN M. RYAN, of Vicksburg, in the county of Warren and State of Mississippi, have invented a new and Improved Saw Swage and Set, of which the following is a full, clear, and exact description.

The object of my invention is to provide a simple, efficient, and easily adjusted and operated saw swage and set, by the use of which the desirable accuracy and uniformity in swaging and setting the saw-teeth are secured.

The invention consists in particular constructions and combinations of parts of the saw swage and set, all as hereinafter fully described and claimed.

Reference is to be had to the accompanying drawings, forming part of this specification, in which similar letters of reference indicate corresponding parts in all the figures.

Figure 1 is an end view of my improved saw swage and set with a part of a circular saw (shown in dotted lines) in position for swaging and setting its teeth. Fig. 2 is a sectional side elevation of the swage and set with the saw-plate in edge view. Fig. 3 is a detail plan view of part of the die-stock and its die; and Fig. 4 is a face view of the swaging and setting die.

The letter A indicates the bed-plate of the saw swage and set, which plate is bolted, as at $a$, to a suitable table or bench, A', and has an under-cut or ⊥ slot at $b$ to receive the headed bolt B, provided with a nut, B', by which the base-piece C of the machine may be fastened to the bed-plate A nearer to or farther from the saw-arbor D, which is supported in journal-boxes $d$ on bench A' at suitable distance from the swage and set to allow the teeth $e$ of the circular or mill saw E, mounted on the arbor, to be brought properly over the bed-die, hereinafter described. The base-piece C has opposite end standards, C' C², the front one, C', being short and having a half bearing or box to support the round die-stock F at one end. The bearing C² has a journal bearing or box encircling the other end of the die-stock F, and is fitted with a screw, G, which may or may not be fitted with a foot-plate, $g$, and may be turned in against the die-stock to bind it at any desired axial adjustment.

The letter H indicates a lever which is pivoted at $h$ to an arm, $c$, projecting from base C, and at $h'$ to a link, I, which in turn is pivoted at $i$ to the outer end of a collar, J, in which is swiveled the bolt end K, which is made fast to the die-stock F, and to which the collar is held by a nut, $k$. Thus constructed the die-stock may be turned axially, and may also be moved lengthwise in its bearings in the base C by the lever H.

L is the bed swaging and setting die on which the front edges of the saw-teeth $e$ rest, and which has a dovetail-shaped cavity, $l$, of a size suitable for the gage or thickness of the saw blade or teeth, and M is the upper or striking die, the face $m$ of which has about the same shape as the bed-die cavity $l$, so that it shall swage the saw-teeth well into the cavity $l$ to give them the proper uniform set at each side of the saw-blade. (See Figs. 3 and 4.) The die M is fixed to a handle, N, which fits snugly, but so as to be turned, in the eye $o$ of a head-piece, O, which has several holes, $p$, in its shank, through any one of which the pivot-pin $o'$ of the head-piece may be passed to pivot the head-piece to or between the lugs $r$ $r$ of a collar, R, fitted snugly, but so as to be turned, on the die-stock F. A set-screw, S, serves to bind the die-handle N at any required axial adjustment in the head-piece O, and a set-screw, T, serves to bind the collar R at any required angle to the die-stock F. I pivot the bed-die L within a cavity, $f$, of the die-stock F on a pin, $l'$, so that the die may be swung over out of the way by the saw-tooth next to be set, which tooth is rested on top of the die when the die falls back to normal position for swaging the tooth on it.

The operation is as follows: The base C will be adjusted on the bench A', so that the inner or forward edges, $e'$, of the saw-teeth $e$ will rest fairly on the face of the bed-die L, the die-stock F being turned axially and secured by the screw G to facilitate the correct relative positions of the parts. The screws S T now will be loosened, and the collar R will be swung around on the die-stock, and the upper die-handle, N, will be turned in the head-piece O, so that the face of the die M will rest fairly on the outer or back edges, $e^2$, of the saw-teeth $e$, and the screws S T will be tightened to secure the parts, as will be understood from Fig. 1 of the drawings. As the saw E is turned to bring each successive tooth e up to lift the die L when the die M is raised, the tooth will be set back on the die L, and the die M then will be let fall on the tooth, when a blow of a hammer on the head of die M will swage and set the tooth ready for the final dressing by the file. Should the saw-plate be "sprung" badly, the screw G and nut B may be loosened, and the base C may be turned horizontally on the bolt B' as a center, and the die-stock F may be adjusted lengthwise by the lever H to bring any particular saw-tooth or number of teeth in proper position to be swaged and set by the dies L M, as above described. When the saw is not sprung, a single setting of the dies L M will serve for setting all the teeth of the saw when a pivoted or swinging die, L, is used, and the dies L M will be changed for saws of different gage or thickness; but when a fixed or solid bed-die is used in the die-stock, the stock must either be drawn back by the lever H or swing around on the bolt B' to allow the successive teeth of the saw to take their position above the bed-die.

By using a flat-faced die L the saw-teeth may be swaged on it directly by a hand-hammer and without using the die M, as will readily be understood.

Having thus described my invention, what I claim as new, and desire to secure by Letters Patent, is—

1. In a saw swage and set, the combination of the bed-plate A, slotted at b, the base C, swiveled to the bed-plate on a bolt, B, having a fastening-nut, B', the die-stock F, movable axially and lengthwise in the base and carrying the bed-die, the lever H, link I, swivel-collar J, connected to the die-stock to give it lengthwise movement, the collar R, adjustable around the stock F, the pivoted head-piece O, the die M, having a handle, N, axially adjustable in the head O, and the set-screws S T, substantially as herein set forth.

2. In a saw swage and set, the combination, with the die-stock F, movable axially and lengthwise in its base-piece, of a pivoted bed-die L, substantially as herein set forth.

3. In a saw swage and set, the combination, with the die-stock F, movable axially and lengthwise in its base-piece and carrying the bed-die, of the lever H, link I, swivel-collar J, bolt K, and the clamp-screw G, substantially as herein set forth.

4. In a saw swage and set, the combination, with the bed-plate A, grooved at b, the base-piece C, swiveled on a bolt, B, provided with a nut, B', allowing the base-piece to be turned axially and moved bodily lengthwise of the slot b, of the die-stock F, supported in the base-piece C, and the saw-arbor D, mounted adjacent to the swage and set so that the teeth of the saw on the arbor may be rested on the bed-die in the stock F, substantially as herein set forth.

5. In a saw swage and set, the combination, with a die-stock, F, movable axially and lengthwise in a support and provided with a bed-die, L, having a dovetail-shaped face-cavity l, of the striking-die M, mounted to be turned axially in a head-piece, O, pivoted to a collar, R, which is adjustable around and along the die-stock, and said die M having a face, m, of similar shape to the cavity l of the bed-die L, substantially as herein set forth.

JOHN M. RYAN.

Witnesses:
JOHN MALONEY,
E. PLATT.